US 6,689,016 B2

(12) United States Patent
Apel (10) Patent No.: US 6,689,016 B2
(45) Date of Patent: Feb. 10, 2004

(54) METHOD AND APPARATUS FOR PRODUCING DOWNSHIFT SIGNALS

(75) Inventor: Peter Apel, Suedkirchen (DE)

(73) Assignee: AB Elektronik GmbH, Werne (DE)

( * ) Notice: Subject to any disclaimer, the term of this patent is extended or adjusted under 35 U.S.C. 154(b) by 40 days.

(21) Appl. No.: 09/896,740

(22) Filed: Jun. 29, 2001

(65) Prior Publication Data
US 2002/0046616 A1 Apr. 25, 2002

(30) Foreign Application Priority Data

Jun. 30, 2000 (DE) .......................................... 100 31 097

(51) Int. Cl.[7] .............................................. B60K 41/04
(52) U.S. Cl. ...................... 477/115; 477/141; 74/513; 200/207
(58) Field of Search ................................ 477/115, 121, 477/131, 132, 133, 136, 141, 905; 74/512, 513, 514, 335; 200/205, 207

(56) References Cited

U.S. PATENT DOCUMENTS

| 3,649,788 A | * | 3/1972 | Heckendorf ......... 200/61.45 R |
| 4,833,947 A | * | 5/1989 | Izumi et al. ................. 477/139 |
| 4,864,288 A | * | 9/1989 | Cross .......................... 340/669 |
| 5,463,260 A | * | 10/1995 | Ono ............................ 307/121 |
| 5,761,967 A | * | 6/1998 | Papenhagen et al. ......... 74/513 |
| 5,855,146 A | * | 1/1999 | Papenhagen et al. ......... 74/560 |
| 5,934,152 A | * | 8/1999 | Aschoff et al. ................ 74/513 |
| 6,087,951 A | * | 7/2000 | Ramsden et al. ........... 340/669 |
| 6,209,418 B1 | * | 4/2001 | Kalsi et al. ................... 74/513 |
| 6,370,983 B1 | * | 4/2002 | Nakamura .................... 74/514 |
| 6,446,500 B1 | * | 9/2002 | Marquardt et al. ........... 73/132 |

FOREIGN PATENT DOCUMENTS

| DE | 19503335 | 12/1995 |
| WO | WO9826341 | 6/1998 |

* cited by examiner

*Primary Examiner*—Rodney H. Bonck
*Assistant Examiner*—David D. Le
(74) *Attorney, Agent, or Firm*—Milde Hoffberg, LLP (57) ABSTRACT

In order to configure the downshift method, and to create signals for an automobile automatic transmission more conveniently, a tilting device of a multi-function device with at least one moveable magnet element as a downshift sensor device is used. When a pedal element causes actuation of a magnet element, a downshift characteristic curve (KL3) is generated with a curve-shaped increase and a maximum followed by a curve decrease (KLS) that ends in a stop window (60). A downshift point (KP) is determined using a tolerance window (59) with a path width, which corresponds to a downshift signal (KS) on a characteristic motion curve (AS) of a motion sensor element.

33 Claims, 10 Drawing Sheets

METHOD AND APPARATUS FOR PRODUCING DOWNSHIFT SIGNALS

BACKGROUND OF THE INVENTION

The invention relates to a method for producing downshift signals for an automatic transmission via a pedal device with at least one pedal element that moves about at least one pivot point and includes at least one motion sensor element.

The invention also relates to a gas pedal device with at least one gas pedal element that may move about a gas pedal pivot point with respect to a surface element, with a motion sensor element that produces a movement characteristic curve, and a downshift-sensor element, whereby the motion sensor element and the downshift sensor device may be moved at least by movement of the gas pedal element, and also a downshift sensor device to perform the method.

A gas pedal device, known from the German Patent No. DE 195 03 335, includes a gas pedal element at whose pivot point is positioned a motion sensor element. A sensor or switch is assigned to the gas pedal element that is controlled by an actuation lever element that can create a downshift signal if necessary.

However, it is not indicated in this reference how the sensor or switch is constructed, or how the signal is created and transmitted.

Downshift switches, also called "kickdown switches", are known in which a spring-loaded, tap-shaped pushrod body is pressed via a recess with spring-tensioned spheres. However, the downshift force characteristic curve may be altered only by the shape of the tap, the number and size of spheres, and the spring force of the spheres. Also, as a rule, the strike point of the pushrod body is the signal triggering point to control an automatic transmission. A further disadvantage is that the individual parts of this known downshift switch are subject to mechanical wear and thus subject to failure. The individual parts therefore cause additional inaccuracy.

A device for creating selector positions for use as a selector in an automobile on-board computer, in a washing machine control, or a gas pedal device is known from the International Patent Publication No. WO 98 26 341 A1, which is based on the German Patent Nos. DE 196 51 315 A1 and DE 297 14 164 U1. In the most simple embodiment of the selector switch, opposing magnetic units on a rotor are displaced from one position to the next, similar to the action of a mechanical detent mechanism. A position sensor unit is connected with the rotor that issues signals corresponding to each position. The rotor is rotatable about a tilt switch device. The tilt switch includes a tilt switch permanent magnet in a housing element secured to a magnetically.

For example, when the rotor is turned, a sensor may be selected in advance by the automobile on-board computer, and this pre-selection may be confirmed by subsequent pressure via the tilt switch. If the rotor is released after this pressure, the permanent magnet returns the rotor to its initial position.

SUMMARY OF THE INVENTION

Based on this state of the art, an object of the present invention is to better configure the downshift process and the creation of signals for an automobile automatic transmission.

Based on the invention, this object is achieved by using a tilting device with at least one movable magnet element as a downshift sensor device. When a pedal element causes actuation of a magnet element, a downshift characteristic curve (KL3) is generated with a curve-shaped increase and a maximum followed by a curve decrease (KLS) that ends in a stop window. A downshift point (KP) is determined using a tolerance window with a path width, which corresponds to a downshift signal (KS) on a characteristic motion curve (AS) of a motion sensor element.

The advantages provided by the invention particularly include the fact that a downshift magnetic force characteristic curve is created that may be correspondingly influenced based on the selection of magnetic forces of the magnets used. A further advantage is that the downshift point on this characteristic curve may be positioned beyond the maximum curve value within a tolerance window. A further advantage is that the downshift magnetic force characteristic curve is created using magnets, so that the mechanical parts are kept to a minimum, thus reducing the possibility of overall wear on the switch and allowing maintenance of smaller tolerances. With mechanical downshift switches, the curve maximum value is achieved after about 3 mm; with a magnetic switch, it is achieved after about 0.3 mm. Since the magnetic downshift switch does not have strict tolerance as is the case with mechanical switches, a good Gaussian distribution curve is achieved at the switching point.

The rising curve slope may be sinusoidal. It may, however, have another wave-like shape.

The curve drop may have a cotangential shape. It may also, however, have another wave-like shape.

The magnet counter-element may create a magnetic force progression, thus effectively determining the rising curve slope and the maximum curve value of the downshift magnetic force characteristic curve.

Additionally, a pressure spring element may be used that, along with the magnet counter-element, helps determine the curve rising slope of the downshift magnetic force characteristic curve.

A rotation angle sensor may be used as a motion sensor element. The sensor may operate according to the Hall principle. Thus, the most accurate motion characteristic curves may be used from which exact downshift signals may be taken. A rotary potentiometer could also be used here.

A Hall circuit may be used as the motion switch. It switches precisely at the downshift point, is equally exact, and is as free from external influences as the rotation angle sensor. An electrical switch could also be used as a motion switch that could provide a downshift signal upon actuation. This switch may operate according to mechanical, semiconductor, or other principles.

The advantages connected with this device consist particularly from the fact that the use of magnetic elements to determine the progression of the downshift magnetic force characteristic curve reduces mechanical wear to a minimum. The characteristic curve may thus be significantly affected at critical points such as the rising slope, the maximum, and the falling slope. Instead of the fixed point using a mechanical switch, one may determine during actuation that the downshift point that creates the downshift signal lies beyond the maximum.

The repelling-magnet element may be disposed opposite the moveable magnet element on the one side, and opposite the plate element on the other side.

Thus, the moveable magnet element may be positioned with one pole opposite the same magnetic pole of the repelling-magnet element and with the other pole at least opposite the plate element. Thus, the curve progression may be very significantly influenced.

The curve progression of the characteristic force curve may be further influenced in that a pressure spring element is positioned between the plate element and the moveable magnet element. The pressure spring element may also be positioned between the moveable magnet element and the repelling-magnet element. The spring element may consist of rubber or spring steel.

The plate element may be made as a steel washer element.

The magnet element is to be moved by a pushrod element. Other elements may be used to move the magnet element.

The magnet element and the repelling-magnet element may be in the form of permanent magnets. The downshift magnetic force characteristic curve is effectively influenced by the selection of permanent magnets.

The magnet element and/or the repelling-magnet element may be divided into halves of a magnetic north and south pole, whereby the magnetic counterforce may be varied or increased. The magnetic counterforce and thereby also the downshift magnetic force characteristic curve may further be influenced if the magnet element is at least partially surrounded by an iron yoke.

Sensors that operate according to the Hall principle or the resistance principle may be used as a motion sensor element.

Switches that operate according to the Hall principle, a semi-conductor basis, or a mechanical basis may be used as a motion switch.

For a full understanding of the present invention, reference should now be made to the following detailed description of the preferred embodiments of the invention as illustrated in the accompanying drawings.

BRIEF DESCRIPTION OF THE DRAWINGS

FIG. 1b is a schematic front view of a gas pedal device as in FIG. 1a.

FIG. 2b is a schematic front view of a gas pedal device as in FIG. 2a.

DESCRIPTION OF THE PREFERRED EMBODIMENT

The preferred embodiments of the present invention will now be described with reference to FIGS. 1–10 of the drawings. Identical elements in the various figures are designated with the same reference numerals.

Figure 1A:
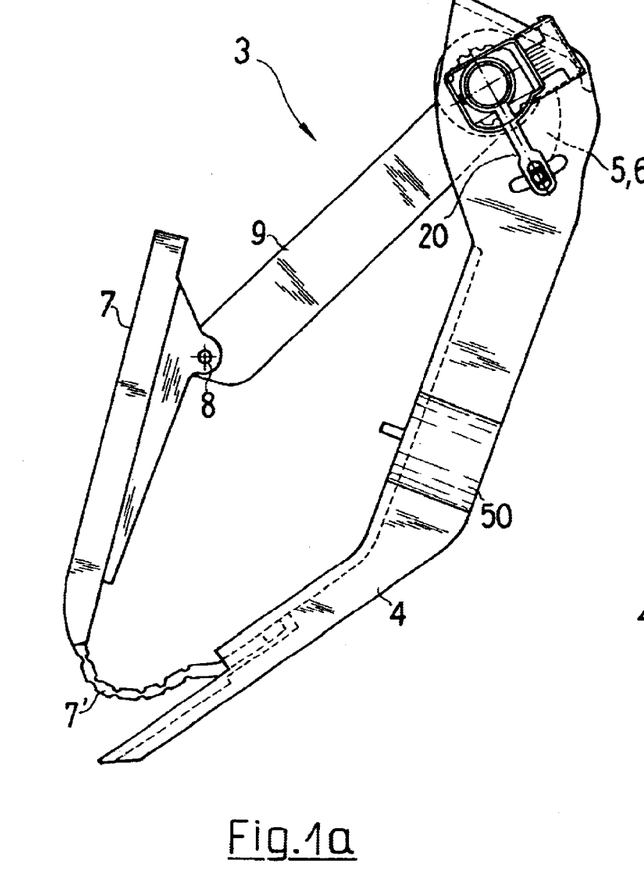
FIG. 1a is a schematic side view of a first gas pedal device with a downshift sensor device.
Figure 1B:
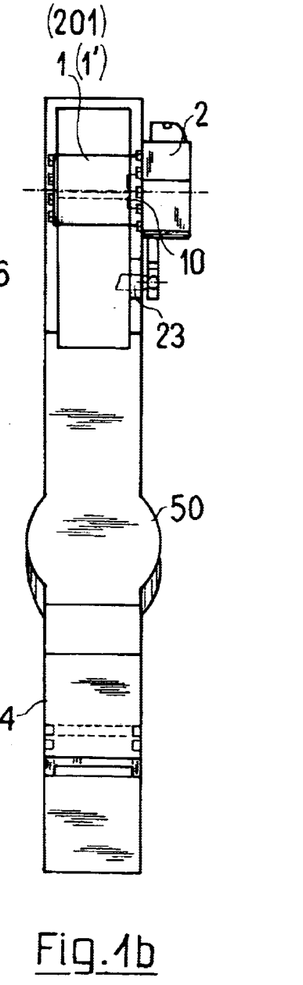

A gas pedal device, as in FIGS. 1a and 1b comprises:
a pedal element 3,
a motion sensor element 2, and
a base plate 4.

Gas pedal element 3 is comprised of a foot pedal element 7 and a pedal lever element 9 that are joined together at a gas pedal pivot point 8 so that they may rotate. From one side, a coupling element 7', that is connected to the base plate 4, is attached to the foot pedal element 7. The pedal lever element 9 is connected with the base plate 4 via a pivot pin 1'. The pivot pin 1' also represents the gas pedal pivot point 1.

Figure 2A:
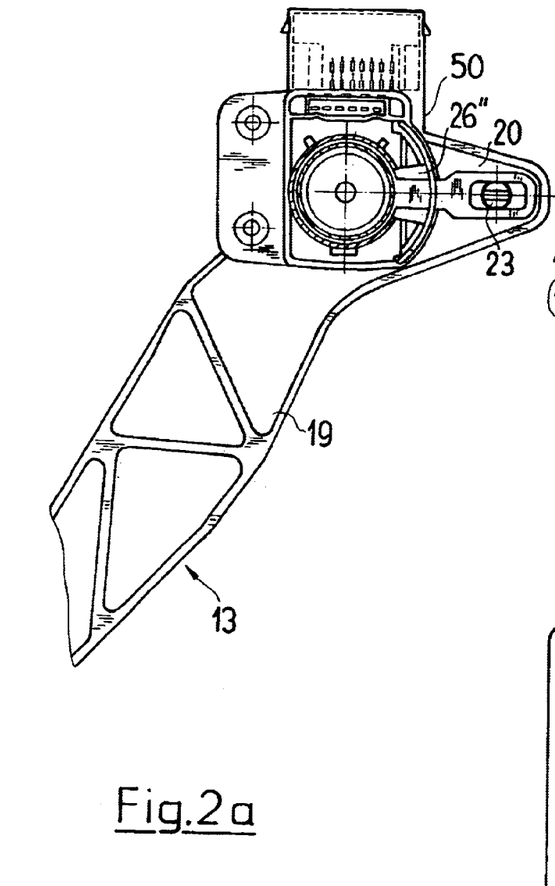
FIG. 2a is a schematic side view of a second embodiment of a gas pedal device with a downshift device and a motion sensor device.
Figure 2B:
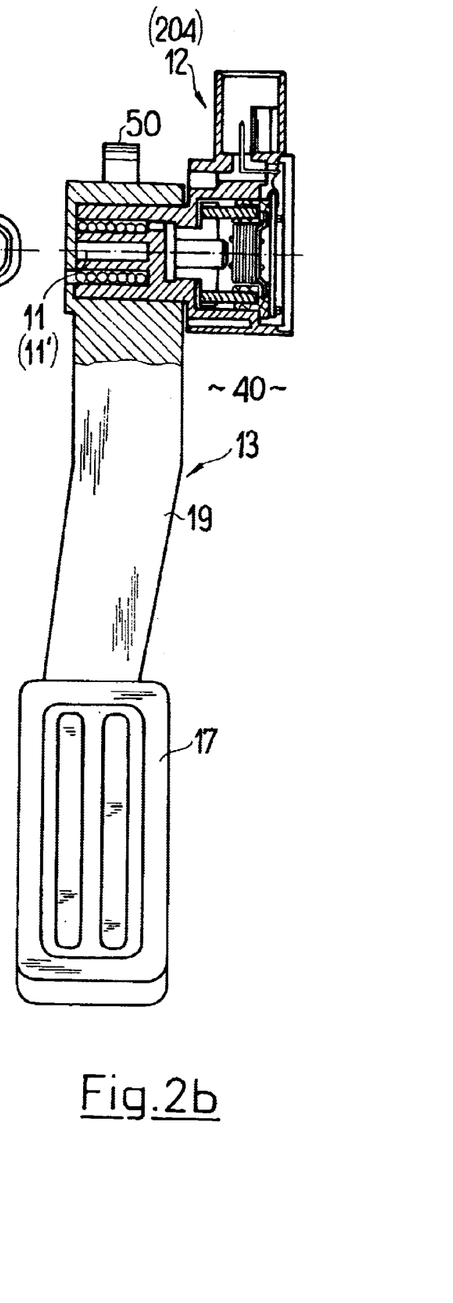

FIGS. 2a and 2b show another embodiment of a gas pedal device in which the pedal element 13 comprises a pedal lever element 19 with a gas pedal element 17 attached to it. The pedal lever element 19 is secured in the area of a floor part 40 of the vehicle via the pivot pin 11'. The pivot pin 11' also forms the gas pedal pivot point 11 here.

A motion sensor element 2 (FIG. 1) or 12 (FIG. 2) is positioned at the gas pedal pivot point 10 and 11, respectively. The motion sensor element 2 or 12 may be configured as a rotation angle sensor 201 or as a rotary potentiometer element 204. It is, of course, also possible that both a rotation angle sensor 201 and a rotary potentiometer element 204 be positioned at the gas pedal pivot point 1 (FIG. 1) or 11 (FIG. 2).

The rotation angle sensor 201 is decoupled via a motion-limiting actuator unit 20 opposite the pedal lever element 9 or 19.

Figure 4:
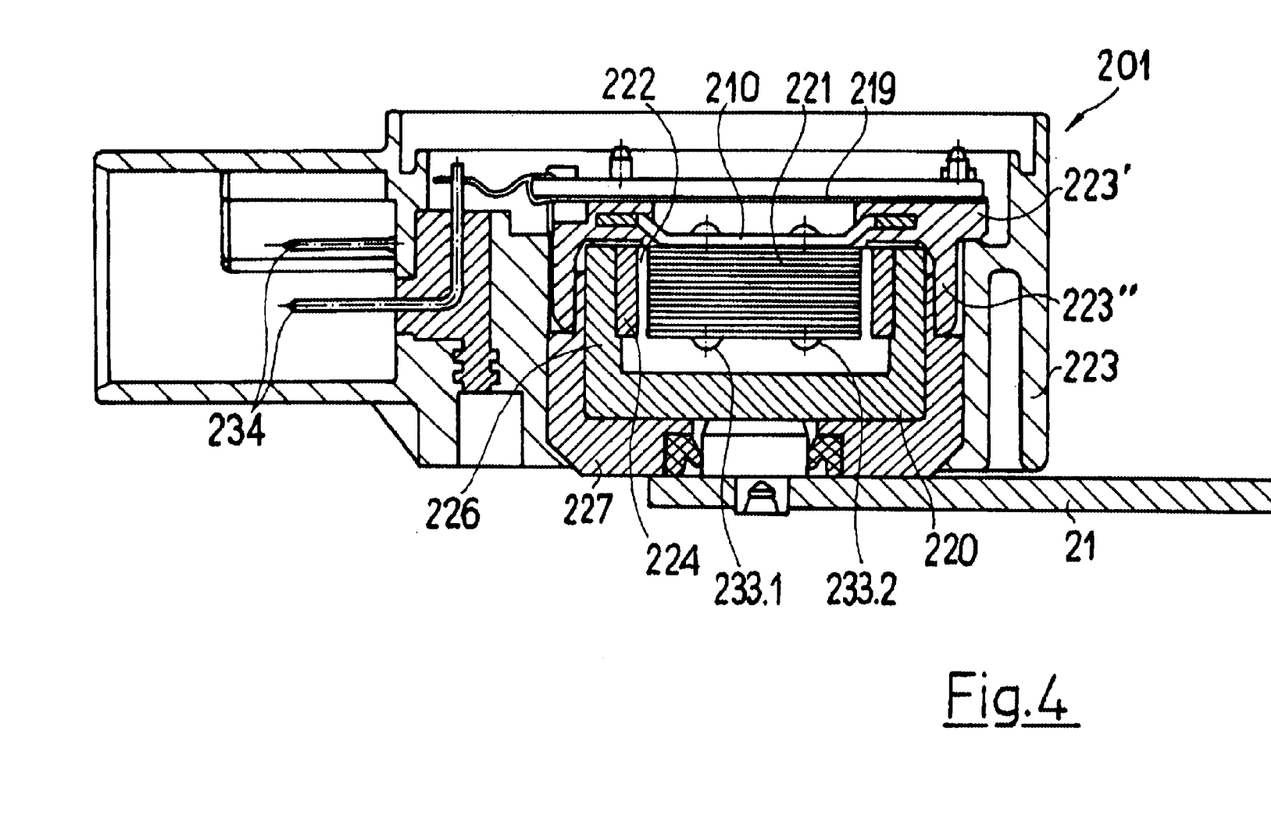
FIG. 4 is cross-sectional view of a modified form of one embodiment of a rotation angle sensor.

The motion sensor element as in FIG. 4 is composed of the stationary unit 219 and the moveable, i.e., rotating unit 220, as already mentioned.

The stationary unit 219 includes a stator element 221 that is comprised of partial stator elements. These partial stator elements have a separation recess (not shown) between them. The partial stator elements of the stator element 221 are shaped as orange-shaped plates, and consist of individual plate packets. The corners of the orange-shaped pieces extending toward the separation recess are deflected at a 45° angle. The stator element 221 is secured to a round plate element 210 by means of tensioning pin elements 233.1 or 233.2. The plate element preferably consists of a shaped aluminum plate. The base plate element 210 is drawn into a base element 223'. This base element 223' is continued as a stepped element 223". Both are formed monolithically from non-conducting plastic. A central recess in the plate element 210 is provided, opposite the separation recess, into which is inserted a Hall element 222.

The rotating unit 220 includes a ring-shaped magnet element 224.

The ring-shaped magnet element 224 is secured by a pot-shaped magnet bracket element 226'. Above this is disposed another pot-shaped friction bearing element 227. The friction bearing element partially extends into round stepped element 223" and rests on it with its remainder.

The round stationary and rotating units 219 or 220 of the rotation angle sensor of FIG. 4, are at least partially surrounded by a housing element 223. The housing element is so shaped that it partially extends over the friction bearing element to better secure and guide its upper edges. Plug contacts 234 extend out of the housing.

FIGS. 3a to 3d show a gas pedal device 101.

The gas pedal device 101 comprises:

a gas pedal element 112, and a base plate element 113 that is connected at a gas pedal pivot point 111, 160.

The gas pedal pivot point is in the form of a barrel hinge link connector 111.

The gas pedal element 112 possesses an overstrike element 123 opposing an understrike element 124 on the base plate element 113 in the area of the barrel hinge link connector 111.

A pedal end 126 of the gas pedal element 112 is located in the area of the barrel hinge link connector 111. Opposite it is a pedal tip area 125. A gas pedal actuation surface element designated 127 is opposite a gas pedal underside 128. The gas pedal actuation surface element possesses an actuation profile in the form of strips, a grid, or similar. Rubber, plastic, or similar materials may be used. On the gas pedal underside of the gas pedal element, corresponding cross strips are arranged that add to the mechanical stability of the gas pedal element 112. Such cross strips are also on an underside of the base plate element 113.

Two adjacent ski-jump-shaped flat spring elements 114 are positioned between the gas pedal element 112 and the base plate element 113.

For a gas pedal module 101, fixed spring bracket elements 116, 117 are positioned on an end of the base plate element 113 that is opposite the barrel hinge link connector 111. The one end of the ski-jump-shaped flat spring element 114, 115 is held by the fixed spring bracket elements 116, 117.

The opposite ends of the flat spring elements 114, 115 are each held by spring slide brackets 118, 119. The spring slide brackets 118, 119 may be slid along slide rail elements 120, 121 that are arranged above a slide surface element 121. The spring slide brackets 118, 119 may also be slid along the slide surface element 121. The slide surface element 122, the slide rail elements 120, 121 arranged on it, and the spring slide brackets 118, 119 free to move on them are arranged on the gas pedal underside 128 at the tip of the gas pedal 125 of the gas pedal element 112.

Figure 3A:
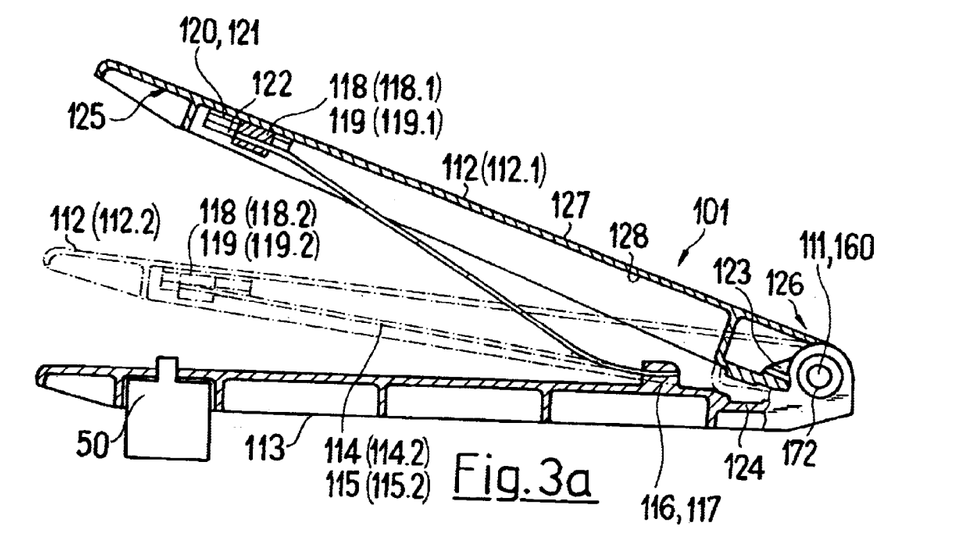
FIG. 3a is a schematic, partial cutaway side view of a third embodiment of a gas pedal device with a downshift device and a motion sensor device.
Figure 3B:
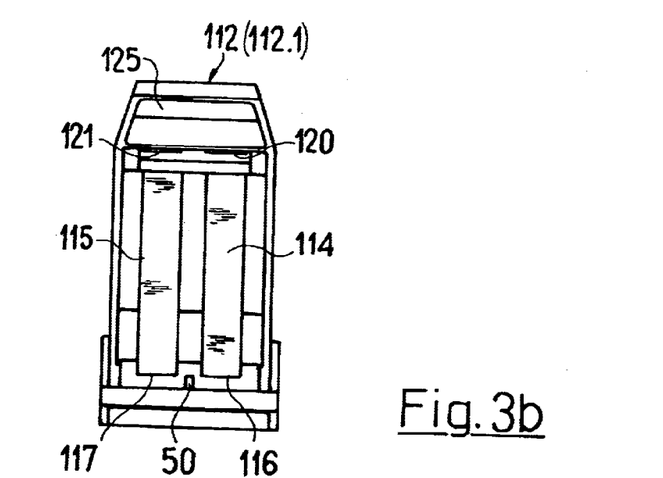
FIG. 3b is a schematic, partial cutaway front view of a gas pedal device as in FIG. 3a with a footboard element.
Figures 3C, 3D:
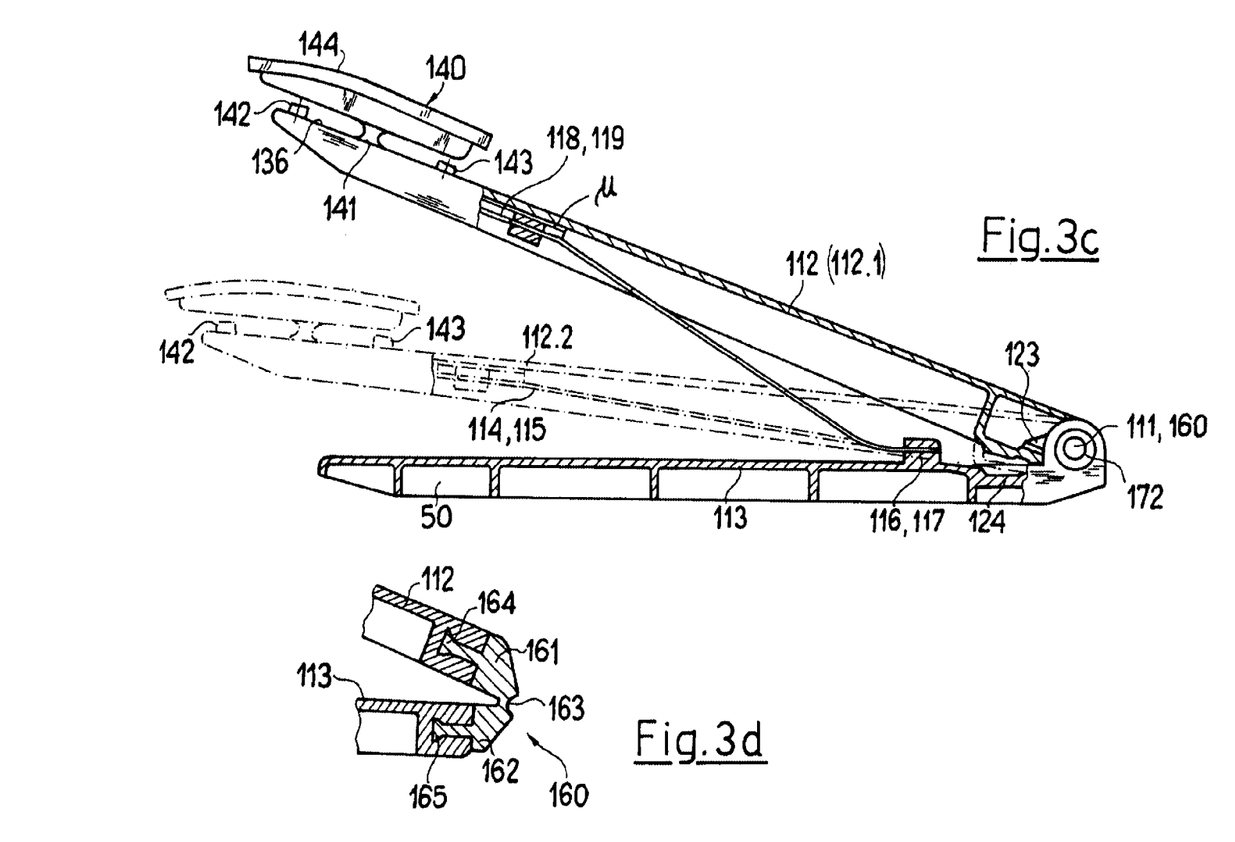
FIG. 3c is in a schematic, partial cutaway side view of a gas pedal device as in FIGS. 3a and 3b in assembled condition.
FIG. 3d is a cross-sectional view of a film hinge element for a gas pedal module as in FIGS. 3a to 3c in assembled condition.

As FIG. 3c shows, a footboard element 140 is positioned on the pedal surface element 127 near the pedal tip 136. The footboard element includes a footboard body 144 that is secured to the pedal actuation surface element using a tilting element 141. The tilting element 141 is in the form of a film hinge link. It has an X-shaped configuration in which bent plastic strips are in opposition; the free space between them is filled with foam.

Front and rear tilting bodies 142, 143 are mounted on the surface element 127 on both sides of the tilting element. The presence or height of the tilting bodies allows definition of motion play of the floorboard body.

As FIG. 3d shows, the gas pedal pivot point may be elegantly realized as a film hinge element 160 that includes a resilient band 163 that is connected with a pedal anchor body 161 and with a base plate anchor body 162.

The pedal anchor body is anchored via a T-anchor 164 in the gas pedal element 112 and the base plate anchor body is anchored via a T-anchor 165 in the base plate element 113. Recesses in the T-anchors increase their grip. A rotation angle sensor device 172 (201) is assigned to the area of the hinge link 111 or the film hinge element 160.

A downshift sensor device, or kickdown switch, is built into these gas pedal devices of differing design.

As FIGS. 1a and 1b show, the downshift sensor device 50 is inserted into the base plate.

As FIGS. 2a and 2b show, the downshift sensor device is attached above the pivot point of the pedal element 13. For this, an intermediary device is used that actuates the device 50.

For the gas pedal device 101 shown in FIGS. 3a to 3d, the downshift sensor device 50 is arranged at the tip of the base of a plate element 113.

The installation locations indicated on the gas pedal device as in FIG. 1a to FIG. 3d are merely examples. The downshift sensor device 50 may be mounted at many other locations. Special intermediary mechanisms may also be provided that transfer gas pedal movement to a corresponding position of the downshift sensor device.

Figure 5:
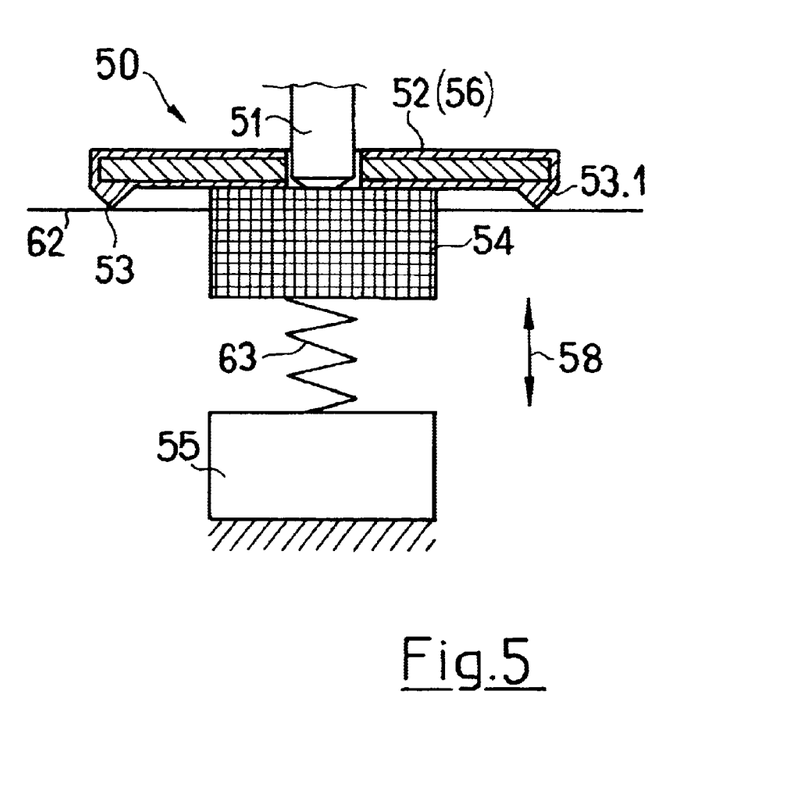
FIG. 5 is in a schematic side view of a downshift sensor device.

The downshift sensor device 50 is shown in FIG. 5 in detail.

It consists of a steel washer element 52 on which a pressure spring element 53 is positioned. The pressure spring element is here in the form of a rubber spring that additionally completely surrounds the steel plate washer element 52. The pressure spring element 53 includes a surrounding rubber ring 53.1 that has an essentially triangular cross-section for the formation of spring characteristics. The rubber ring 53.1 is supported on an overlay plate 62.

Figure 6A:
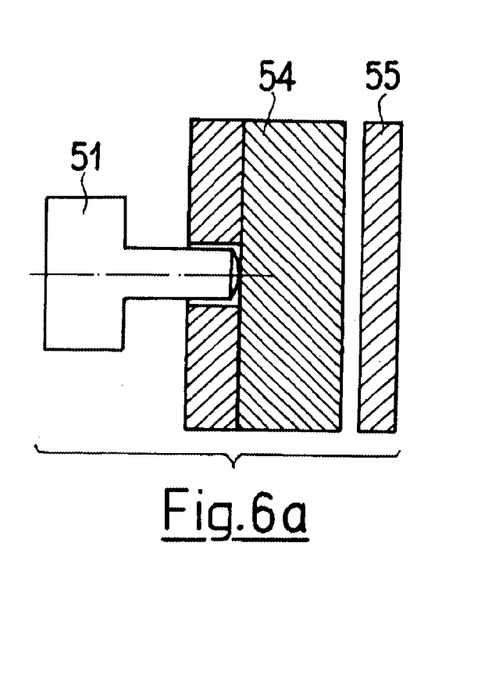
FIGS. 6a and 6b show different configurations of a device as in FIG. 5.
Figure 6B:
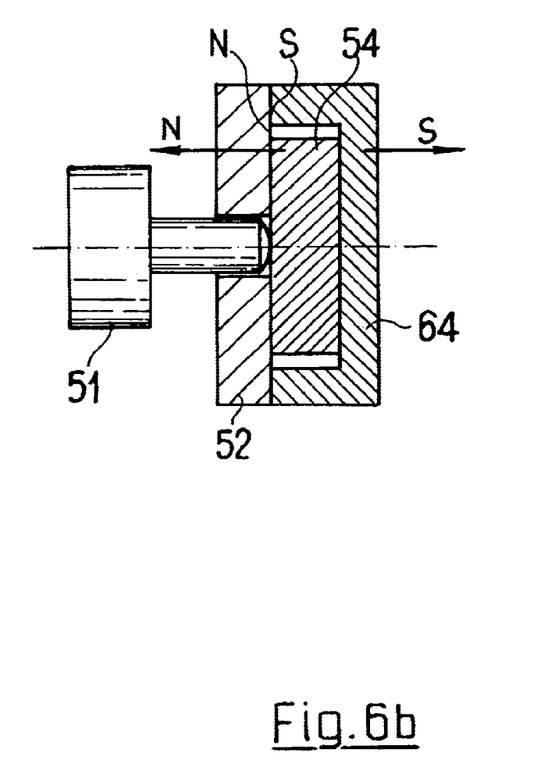
Figure 7:
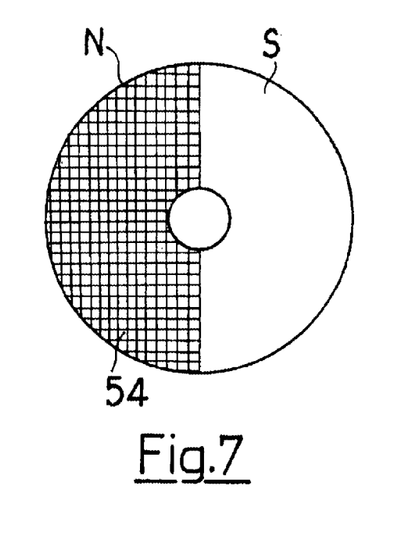
FIGS. 7 and 8 illustrate different embodiments of a magnet device as in FIG. 6.
Figure 8:
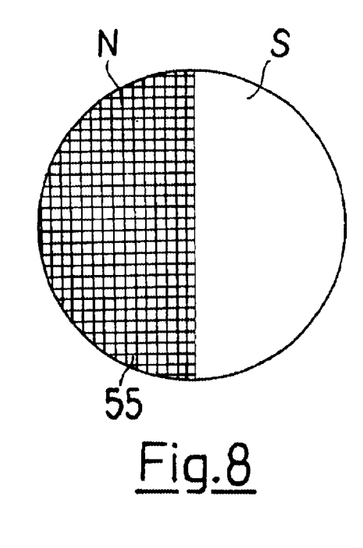

A magnet element 54 is positioned below the steel plate washer element 52. It is opposite a repelling magnet element 55. Both magnet elements 54, 55 are so positioned that their magnetic north poles oppose each other, so that a magnetic repulsive effect 58 is developed. FIGS. 6a and 6b show cutaway views of the steel plate element 52, the magnet 54, and the pushrod element 51. As FIG. 6b shows, the magnet 54 is surrounded by a U-shaped iron yoke 64. The north pole N of the magnet extends toward the pushrod element 51 and opposite the magnetic south pole S. This ensures that the steel plate element 52 has a north pole N and the U-shank of the iron yoke 64 has a south pole S and a magnetic short circuit with a highly attractive force is present. FIG. 7 and 8 show that the magnets 54 and 55 each have half a north pole N and half a south pole S. This increases the magnetic force very significantly.

A pushrod element 51 sits on the magnet element 54 that is guided by the steel washer element 52 and the pressure spring element 53.

FIGS. 6a and 6b show cutaway views of the steel plate element 52, the magnet 54, and the pushrod element 51. As FIG. 6b shows, the magnet 54 is surrounded by a U-shaped iron yoke 64. The north pole N of the magnet extends toward the pushrod element 51 and opposite the magnetic south pole S. This ensures that the steel plate element has a north pole N and the U-shank of the iron yoke has a south pole S and a magnetic short circuit with a highly attractive force is present. FIGS. 7 and 8 show that the magnets 54 and 55 each have half a north pole N and half a south pole S. This increases the magnetic force 39 very significantly.

Figure 9:
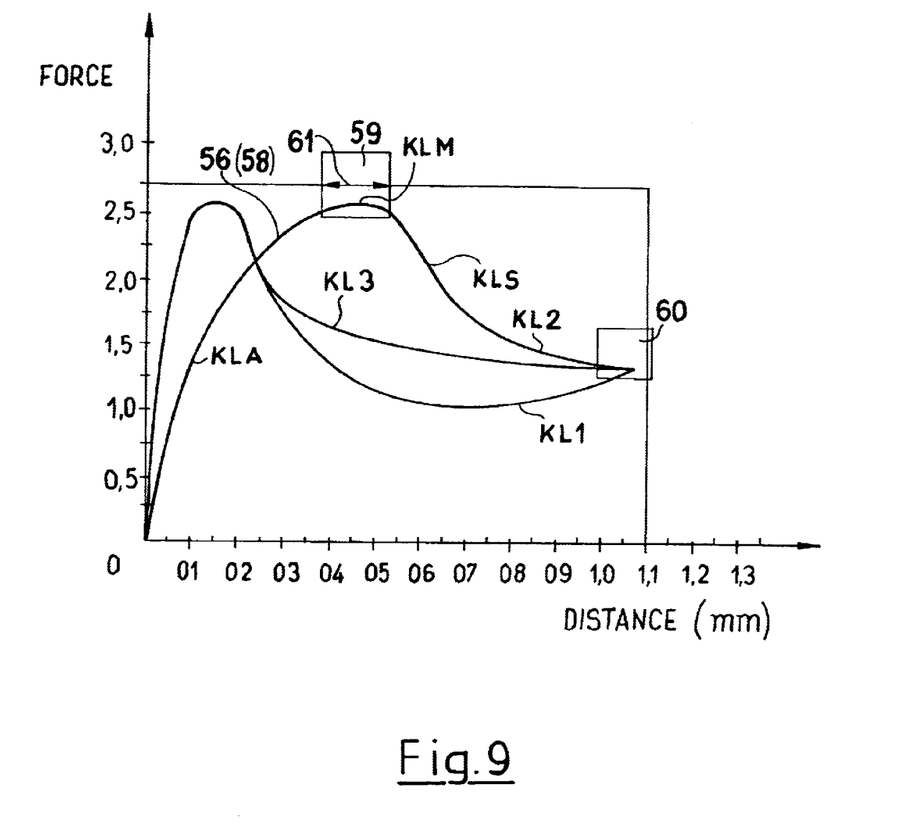
FIG. 9 shows various downshift magnetic force characteristic curves of downshift sensor devices as in FIGS. 5 to 8.

FIG. 9 shows various downshift magnetic force characteristic curves KL1, KL2, KL3 that may be created by means of the downshift sensor device 50. The various characteristic curves are formed by the implementation of magnet elements 54, 55 that develop magnetic forces of different strengths. Permanent magnets are used as magnet elements.

When the pushrod element 51 is actuated, only that force that forces the rubber ring 53.1 together must be overcome at first. If the pressure spring element 53 is relaxed, the increasing magnetic opposing force 58, due to the magnet 55, determines further curve progression. At the beginning is a curve-shaped increase, particularly a sine wave curve shaped increase, KLA that continues to the curve maximum KLM, somewhere within the range 61 defined by a window 59. For this, the magnetic force 56 is overcome by the magnetic opposing force 58. After the curve maximum, a curve-shaped, particularly cotangent curve, decrease KLS continues. This may have a different progression, and is eventually led into a stop region 60.

The creation of downshift signals KS, as result from the preferred embodiments, will now be explained using the gas pedal element shown in FIG. 1*a* and 1*b*, the rotation angle sensor elements shown in FIG. 4, and the downshift sensor device 50 shown in FIGS. 5 to 8 with the downshift characteristic magnetic force curves shown in FIG. 9.

The creation of downshift signals KS, as result from the exemplary embodiments, are explained using the gas pedal element shown in FIGS. 1*a* and 1*b*, the rotation angle sensor elements shown in FIG. 4, and the downshift sensor device shown in FIGS. 5 to 8 with the downshift characteristic magnetic force curves shown in FIG. 9.

The creation of downshift signals KS is required only when a brief acceleration of a vehicle with an automatic transmission is necessary.

For this, the foot pedal element 7 of the gas pedal element 3 is forced toward the base plate 4. At this time, the pedal lever element 9 of the pedal element 3 is pressed against the pushrod element 51 of the downshift sensor device 50.

Figure 10:
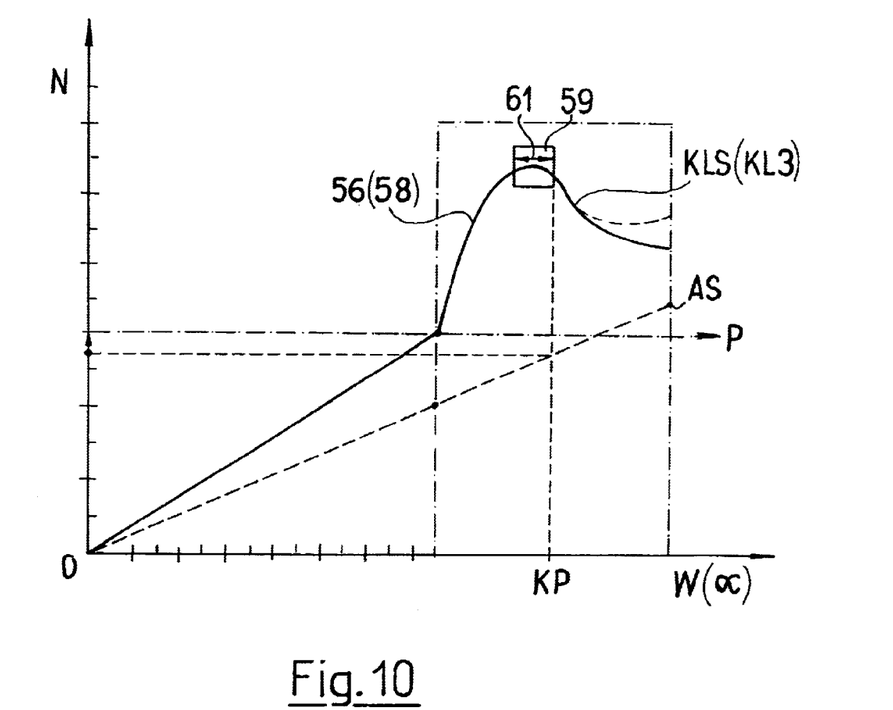
FIG. 10 graphically illustrates the movement progression of a gas pedal device with an associated downshift characteristic magnetic force curve and an associated characteristic movement curve parallel to the movement of the gas pedal device.

The movement interactions are shown summarized in FIG. 10. Here, the upper curve shows the force N as a function of the pedal path P. Below this is a motion characteristic curve AS of the rotation angle sensor 201 dependent on rotational angle α that corresponds to the returned pedal path P.

Upon sudden depression of the gas pedal element 7, a pedal path P is pushed back that is shown increasing linearly for the sake of illustration. The rotating unit 219 of the rotation angle sensor is rotated to the same extent. By means of the ring-shaped magnet element 224, initial voltage values are created using the Hall element 222 that determine the linearly-increasing characteristic curve AS.

If the passing maneuver is terminated, the gas pedal element 7 is relieved from tension and the pushrod element 51 is released. The magnet element 54 again immediately moves toward the steel plate element 52 and again presses on the rubber ring 53.1 of the pressure spring element 53.

If it is required to further influence the downshift characteristic magnetic force curve, an additional pressure spring 60 with a characteristic spring curve to be determined may be placed between the magnet elements 54 and 55, as shown in FIG. 5, or the magnet element 55 may be replaced by the spring 60. The particular advantage of the device 50 consists primarily of the fact that it is almost completely free of wear problems because of the use of magnetic forces. In any event, the most varying downshift characteristic magnetic force curves required to provide convenient operation of the automatic transmission may be created.

There has thus been shown and described a novel method and apparatus for producing downshift signals which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow. If it is required to further influence the downshift characteristic magnetic force curve, an additional pressure spring 63 with a characteristic spring curve to be determined may be placed between the magnet elements 54 and 55, as shown in FIG. 5, or the magnet element 55 may be replaced by the spring 63. The particular advantage of the device 50 consists primarily of the fact that it is almost completely free of wear problems because of the use of magnetic forces. In any event, the most varying downshift characteristic magnetic force curves required to provide convenient operation of the automatic transmission may be created.

What is claimed is:

1. Apparatus for producing downshift signals (KS) for an automatic transmission by means of a gas pedal device with at least one pedal element that moves about at least one pivot point, the position of which is determined using at least one motion sensor element to produce a characteristic motion signal (AS), said apparatus comprising a down kickdown switch having at least one moveable magnet element for generating a downshift characteristic magnetic force curve (KL1, KL2, KL3) with a curve-shaped characteristic curve increase (KLA) with a curve maximum (KLM), followed by a curve decrease (KLS) that ends in a stop window, when the magnet element is actuated by the pedal element; wherein a downshift point (KP) is positioned within a tolerance window at the curve maximum (KLM).

2. Apparatus according to claim 1, wherein the motion sensor element is a rotation angle sensor.

3. Apparatus according to claim 1, wherein the motion sensor element is a rotary potentiometer.

4. Apparatus according to claim 1, wherein the at least one movable magnet element is at least partially surrounded by an iron yoke.

5. Apparatus according to claim 1, wherein at least the movable magnet element is at least partially surrounded by an iron yoke.

6. Apparatus according to claim 1, wherein the motion sensor element is a Hall circuit.

7. Apparatus according to claim 1, wherein the motion sensor element is an electric switch.

8. Apparatus according to claim 1, further comprising means for determining the curve increase (KLA) of the downshift characteristic curve (KL1, KL2, KL3).

9. Apparatus according to claim 1, further comprising a pressure spring element which creates a spring force progression by means of which the curve increase (KLA) and the curve maximum (KLM) of the downshift characteristic curve (KL1, KL2, KL3) are determined.

10. Apparatus according to claim 9, wherein the pressure spring element includes a pressure spring that is arranged adjacent the movable magnet element on one side, and at least one plate element consisting of a magnetically conductive material disposed on the other side of the magnet movable element.

11. Apparatus according to claim 1, wherein the kickdown switch comprises at least one plate element consisting of magnetically conductive material positioned on one side of said at least one moveable magnet element.

12. Apparatus according to claim 11, wherein the plate element is a steel washer element.

13. Apparatus according to claim 1, further comprising a magnetic repelling element which creates a magnetic force progression by means of which the curve increase (KLA) and the curve maximum (KLM) of the downshift characteristic curve (KL1, KL2, KL3) are determined.

14. Apparatus according to claim 13, wherein the magnetic repelling element includes a repelling magnet element that is arranged adjacent the movable magnet element on one side, and at least one plate element consisting of a magnetically conductive material disposed on the other side of the movable magnet element.

15. Apparatus defined in claim 14, wherein the moveable magnet element with a magnetic pole (N, S) is disposed adjacent the same magnetic pole (N, S) of the repelling magnet element with its other magnetic pole (N, S) adjacent the plate element.

16. Apparatus according to claim 14, further comprising a pressure spring element positioned between the repelling magnet element and the moveable magnet element.

17. Apparatus according to claim 14, further comprising a pressure spring element positioned between the plate element and the moveable magnet element.

18. Apparatus according to claim 14, further comprising a pushrod element forming the magnet element.

19. Apparatus according to claim 14, wherein the movable magnet element and the repelling magnet element comprise permanent magnets.

20. Apparatus according to claim 14, wherein at least one of the moveable magnet element and the repelling magnet element includes a magnetic north pole (N) as one half, and a magnetic south pole (S) as the other half.

21. Apparatus for producing downshift signals (KS) for an automatic transmission by means of a gas pedal device with at least one pedal element that moves about at least one pivot point, the position of which is determined by means of at least one motion sensor element, said apparatus comprising a kickdown switch having at least one moveable magnet element, which is opposed by at least one magnet repelling element, for generating a downshift characteristic magnetic force curve (KL1, KL2, KL3) with a curve-shaped characteristic curve increase (KLA) with a curve maximum (KLM), followed by a curve decrease (KLS) that ends in a stop window, when the magnet element is actuated by the pedal element; wherein a downshift point (KP) is positioned within a tolerance window at the curve maximum (KLM).

22. Apparatus according to claim 21, wherein the magnetic repelling element creates a magnetic force progression by means of which the curve increase (KLA) and the curve maximum (KLM) of the downshift characteristic curve (KL1, KL2, KL3) are determined.

23. Apparatus according to claim 21, further comprising a pressure spring element for determining, together with the magnetic repelling element, the curve increase (KLA) of the downshift charactertic curve (KL1, KL2, KL3).

24. Apparatus according to claim 21, wherein the motion sensor element is a Hall circuit.

25. Apparatus according to claim 21, wherein the motion Sensor element is an electric switch.

26. Apparatus according to claim 21, further comprising a pushrod arranged to press against the movable magnet element.

27. Apparatus according to claim 21, wherein the movable magnet element and the repelling magnet element comprise permanent magnets.

28. Apparatus according to claim 21, wherein the movable magnet element and the repelling magnet element includes a magnetic north pole (N) as one half, and a magnetic south pole (S) as the other half.

29. Apparatus according to claim 21, wherein the kickdown switch comprises said least one repelling magnet element positioned on one side, and at least one plate element consisting of magnetically conductive material positioned on the other side, of said at least one moveable magnet element.

30. Apparatus according to claim 29, wherein the plate element is a steel washer element.

31. In an accelerator pedal device for producing downshift signals for an automatic transmission, said accelerator pedal device comprising, in combination:

at least one accelerator pedal element that is movable about a pedal pivot point with respect to a base surface element;

a motion sensor element that produces a motion signal (AS) in response to movements of the accelerator pedal element about the pivot point; and a kickdown switch arranged in the path of movement of the accelerator pedal element;

the improvement wherein the kickdown switch includes at least one moveable magnet element and at least one repelling element in opposition thereto, for generating a downshift characteristic magnetic force curve (KL1, XL2, KL3); and a downshift signal (KS) is generated with a downshift point (KS) after generating the curve maximum (KLM) of the downshift characteristic curve (KL1, KL2, KL3).

32. Apparatus according to claim 31, wherein the motion sensor element is a rotation angle sensor.

33. Apparatus according to claim 31, wherein the motion sensor element is a rotary potentiometer.

* * * * *